(12) United States Patent
Wang et al.

(10) Patent No.: US 10,990,835 B2
(45) Date of Patent: Apr. 27, 2021

(54) ROAD SIGN RECOGNITION METHOD AND SYSTEM

(71) Applicant: WUHAN JIMU INTELLIGENT TECHNOLOGY CO., LTD., Hubei (CN)

(72) Inventors: Shuliang Wang, Hubei (CN); Duan Xu, Hubei (CN); Guohu Liu, Hubei (CN); Jianwei Cheng, Hubei (CN)

(73) Assignee: WUHAN JIMU INTELLIGENT TECHNOLOGY CO., LTD., Hubei (CN)

( * ) Notice: Subject to any disclaimer, the term of this patent is extended or adjusted under 35 U.S.C. 154(b) by 5 days.

(21) Appl. No.: 16/519,346

(22) Filed: Jul. 23, 2019

(65) Prior Publication Data
US 2019/0347497 A1    Nov. 14, 2019

Related U.S. Application Data

(63) Continuation of application No. PCT/CN2018/073800, filed on Jan. 23, 2018.

(30) Foreign Application Priority Data

Jan. 25, 2017   (CN) .......................... 201710056313.2

(51) Int. Cl.
*G06K 9/00*   (2006.01)
*G06T 7/62*   (2017.01)
(Continued)

(52) U.S. Cl.
CPC ....... *G06K 9/00818* (2013.01); *G06K 9/4652* (2013.01); *G06T 7/62* (2017.01);
(Continued)

(58) Field of Classification Search
CPC ............. G06K 9/00818; G06K 9/4652; G06K 9/00791; G06T 7/62; G06T 7/90; G06T 7/70; G06T 2207/30248; G08G 1/09623
See application file for complete search history.

(56) References Cited

U.S. PATENT DOCUMENTS 6,285,393 B1 *   9/2001   Shimoura ............ G05D 1/0246
                                                      348/119
6,801,638 B1 *  10/2004   Janssen .................. B60K 35/00
                                                      382/104
(Continued)

FOREIGN PATENT DOCUMENTS

CN        103034836 A      4/2013
CN        105279488 A      1/2016
(Continued)

OTHER PUBLICATIONS

Liu, Yujie, "Research & Implementation of Speed Limit Sign Recognition Algorithm". Chinese Master's Theses Full-text Database, Information Science and Technology, Apr. 15, 2013, Series No. 4, Ch. 2, China.

(Continued)

*Primary Examiner* — Manav Seth
(74) *Attorney, Agent, or Firm* — Tim Tingkang Xia, Esq.; Locke Lord LLP (57) ABSTRACT

Road sign recognition method and system. The method includes performing HSV space color threshold binarization on a single frame image in a road image, obtaining a sign connected region through localization; calculating a length-to-width ratio of the sign connected region to eliminate a false target, calculating a distance from a contour edge to a target center position in the sign connected region, obtaining a target localization region with a circular contour of the sign connected region; intercepting a corresponding grayscale image and calculating an average grayscale value of the (Continued)

grayscale image, performing binarization on the grayscale image in the target localization region, obtaining a binary image of each target localization region; extracting connected regions in the binary images, sorting the connected regions according to coordinates; calculating and determining number or character inside the target localization region by using a neural-network mode recognition algorithm; and calculating confidence.

7 Claims, 4 Drawing Sheets

(51) Int. Cl.
    *G06T 7/90*         (2017.01)
    *G06T 7/70*         (2017.01)
    *G06K 9/46*         (2006.01)
    *G08G 1/0962*     (2006.01)

(52) U.S. Cl.
    CPC ............... *G06T 7/70* (2017.01); *G06T 7/90* (2017.01); *G08G 1/09623* (2013.01); *G06T 2207/30248* (2013.01)

(56) References Cited

U.S. PATENT DOCUMENTS

| | | | | |
|---|---|---|---|---|
| 6,813,545 | B2* | 11/2004 | Stromme | G06K 9/00818 340/425.5 |
| 6,859,546 | B2* | 2/2005 | Matsukawa | G06K 9/00818 342/90 |
| 7,068,844 | B1* | 6/2006 | Javidi | G06K 9/00818 382/209 |
| 7,965,870 | B2* | 6/2011 | Kobayashi | G06T 7/11 382/104 |
| 8,064,643 | B2* | 11/2011 | Stein | G06K 9/00818 382/104 |
| 8,174,570 | B2* | 5/2012 | Yoneyama | G06K 9/00818 348/135 |
| 8,620,032 | B2* | 12/2013 | Zeng | G08G 1/09623 382/104 |
| 8,894,461 | B2* | 11/2014 | Horovitz | A63H 33/00 446/175 |
| 8,953,842 | B2* | 2/2015 | Zobel | G06K 9/00818 382/103 |
| 8,977,007 | B1* | 3/2015 | Ferguson | G06K 9/00825 382/104 |
| 8,983,136 | B2* | 3/2015 | Liu | G06K 9/00818 382/104 |
| 8,995,723 | B2* | 3/2015 | Stein | G08G 1/0967 382/104 |
| 9,056,395 | B1* | 6/2015 | Ferguson | B60W 30/16 |
| 9,129,156 | B2* | 9/2015 | Herbschleb | G06K 9/4652 |
| 9,311,543 | B2* | 4/2016 | Cho | G06K 9/00818 |
| 9,558,412 | B2* | 1/2017 | Ogawa | H04N 5/23229 |
| 9,959,624 | B2* | 5/2018 | Raghu | G06K 9/00818 |
| 9,984,568 | B2* | 5/2018 | Imai | G06K 9/00818 |
| 10,186,147 | B2* | 1/2019 | Imai | G08B 5/22 |
| 10,229,592 | B1* | 3/2019 | Elsheemy | B60T 8/17557 |
| 10,242,246 | B2* | 3/2019 | Bartels | G06K 9/4652 |
| 10,296,794 | B2* | 5/2019 | Ratti | G06K 9/00785 |
| 10,300,853 | B2* | 5/2019 | Yokochi | B60K 35/00 |
| 10,325,157 | B2* | 6/2019 | Cho | G06K 9/00771 |
| 10,325,166 | B2* | 6/2019 | Kwant | G06K 9/4642 |
| 2012/0002053 | A1 | 1/2012 | Stein et al. | |

FOREIGN PATENT DOCUMENTS

| | | |
|---|---|---|
| CN | 105740860 A | 7/2016 |
| CN | 105809138 A | 7/2016 |
| CN | 107066933 A | 8/2017 |

OTHER PUBLICATIONS

Liang, Yao, "Research on Speed Limit Traffic Sign Recognition Based on Machine Vision Technology", Chinese Master's Theses Full-text Database, Information Science and Technology, Apr. 15, 2015, Series No. 4, Ch. 2 and Ch. 4, China.

Yang, Xin, "Traffic Sign Recognition Research and Application Based on Convolutional Neural Network", Chinese Master's Theses Full-text Database, Information Science and Technology, Jul. 15, 2015, Series No. 7, Ch. 5, China.

State Intellectual Property Office of People's Republic of China, "International Search Report for PCT Application No. PCT/CN2018/073800", China, May 2, 2018.

* cited by examiner

ROAD SIGN RECOGNITION METHOD AND SYSTEM

CROSS-REFERENCE TO RELATED APPLICATIONS

This application is a continuation application of PCT Patent Application Serial No. PCT/CN2018/073800, filed Jan. 23, 2018, which itself claims priority to Chinese Patent Application No. 201710056313.2, filed Jan. 25, 2017 in the State Intellectual Property Office of P.R. China, which are hereby incorporated herein in their entireties by reference.

FIELD

The present disclosure relates to the field of machine vision and artificial intelligence, and in particular, to a road sign recognition method and system.

BACKGROUND

Video image road sign recognition relies on determining limiting information of a sign on moving of a vehicle. A traditional method is as follows: firstly, a position of the sign is localized by using an image processing method; then, numbers and characters of the sign are segmented; and finally, template matching or a neural network algorithm is used for recognition.

A speed limit sign can be effectively determined by using the traditional method, but a width limit sign and a height limit sign cannot be distinguished. A main reason is that the traditional method only focuses on recognition and determining of numbers and characters in the road sign, and ignores features of the sign.

In the traditional template matching method, a target size needs to be scaled to be equal to a template size, then corresponding pixels are compared and statistics about the corresponding pixels is collected, and a pixel with highest similarity is used an outputted result. Calculation efficiency of this method is low, and a scaling process is easy to cause image distortion. Consequently, the result is greatly influenced.

However, the commonly used neural network algorithm introduces too many features. Consequently, efficiency is affected and the commonly used neural network algorithm is susceptible to noise. A balance between calculation efficiency and calculation accuracy is fully considered through division of nine square grids.

SUMMARY

A technical problem to be solved by the present disclosure is to provide a road sign recognition method and system for defects that a template matching method is low in efficiency and easily affects a result, and a commonly used neural network algorithm is susceptible to noise in the prior art.

A technical solution used in the present disclosure to solve the technical problem of the present disclosure is as follows:

The present disclosure provides a road sign recognition method, including the following steps:

S1. obtaining a road image of a vehicle in a moving process in real time, performing color threshold binarization on a single frame image in the road image in the HSV space, localizing a sign according to a color feature of the sign, and obtaining a localized sign connected region;

S2. calculating a length-to-width ratio of the sign connected region according to information about a position and a size of the localized sign connected region, and setting a threshold of the length-to-width ratio to eliminate a false target; and calculating a distance from a contour edge to a target center position in the sign connected region, and obtaining a target localization region with a circular contour of the sign connected region;

S3. in a grayscale image on which color threshold binarization is performed, intercepting a corresponding grayscale image and calculating an average grayscale value of the grayscale image according to the obtained target localization region, performing binarization on the grayscale image of the target localization region by using the average grayscale value as a threshold, and obtaining a binary image of each target localization region;

S4. extracting connected regions in the binary images of the target localization regions, sorting the connected regions according to coordinates, and obtaining a binary image of a number or a character inside each target localization region;

S5. calculating and determining the binary image of the number or the character inside the target localization region by using a algorithm of neural network for pattern recognition, and obtaining a number or a character on a target sign;

S6. saving a calculation result of a current frame image, comparing a calculation result of a subsequent frame image with the calculation result of the current frame image, calculating confidence, and outputting a recognition result that meets a confidence requirement.

Further, the threshold of the length-to-width ratio that is set to eliminate the false target in step S2 of the present disclosure ranges from 0.9 to 1.1.

Further, step S3 of the present disclosure further includes a method of recognizing a height limit sign and a width limit sign:

if there is a sign with longitudinal symmetrical triangles in a circular contour of the circular target localization region, and a ratio of a distance between apex angles of the triangles to a diameter of the circular contour ranges from 0.7 to 0.9, it indicates that the sign is the height limit sign; and if there is a sign with bilateral symmetrical triangles in a circular contour of the circular target localization region, and a ratio of a distance between apex angles of the triangles to a diameter of the circular contour ranges from 0.7 to 0.9, it indicates that the sign is the width limit sign.

Further, a specific method of the neural network mode recognition algorithm in step S5 of the present disclosure includes:

collecting statistics about a binary image of a number or a character in a to-be-recognized target localization region as a 9-dimensional feature matrix, dividing the binary image into nine square grids, and collecting statistics about a black-to-white pixel ratio in each grid to obtain a 9-dimensional feature matrix, where a sigmoid activation function is used in a network hidden layer, calculation is performed by using a competition network in an output layer, and the number or the character represented by the binary image is obtained.

Further, a method for calculating the 9-dimensional feature matrix in the present disclosure specifically includes:

if a resolution of the binary image of the number or the character obtained through interception is m×n, which is formed by m rows and n columns of pixels, and indicated as a matrix $D_{m \times n}$, calculating a 9-dimensional feature matrix $E_{1 \times 9}$ by using the following formula:

$$E = [\,e_1\ \ e_2\ \ e_3\ \ e_4\ \ e_5\ \ e_6\ \ e_7\ \ e_8\ \ e_9\,]$$

$$e_i = \sum_{i=1}^{\frac{m}{3}} \sum_{j=1}^{\frac{n}{3}} \mathrm{cal}(d(i,j))$$

$$\mathrm{cal}(d(i,j)) = \begin{cases} 0, & \text{if } d(i,j) = 0 \\ 1, & \text{if } d(i,j) \ne 0 \end{cases}$$

$$d = \begin{cases} D\left(1:\frac{m}{3},\ 1:\frac{n}{3}\right), & \text{if } i = 1 \\ D\left(1:\frac{m}{3},\ \frac{n}{3}+1:\frac{2\times n}{3}\right), & \text{if } i = 2 \\ D\left(1:\frac{m}{3},\ \frac{2\times n}{3}+1:n\right), & \text{if } i = 3 \\ D\left(\frac{m}{3}+1:\frac{2\times m}{3},\ 1:\frac{n}{3}\right), & \text{if } i = 4 \\ D\left(\frac{m}{3}+1:\frac{2\times m}{3},\ \frac{n}{3}+1:\frac{2\times n}{3}\right), & \text{if } i = 5, \\ D\left(\frac{m}{3}+1:\frac{2\times m}{3},\ \frac{2\times n}{3}+1:n\right), & \text{if } i = 6 \\ D\left(\frac{2\times m}{3}+1:m,\ 1:\frac{n}{3}\right), & \text{if } i = 7 \\ D\left(\frac{2\times m}{3}+1:m,\ \frac{n}{3}+1:\frac{2\times n}{3}\right), & \text{if } i = 8 \\ D\left(\frac{2\times m}{3}+1:m,\ \frac{2\times n}{3}+1:n\right), & \text{if } i = 9 \end{cases}$$

and obtaining a feature matrix E of the to-be-recognized target number or character through calculation.

Further, the method of the present disclosure further includes a method for optimizing the matrix E according to a result obtained through sample statistics collection and calculation:

based on the sample statistics collection, obtaining three correction matrixes $\text{offset}_{1\times 9}$, $\text{gain}_{1\times 9}$, $y_{1\times 1}$, and correcting the feature matrix as $e_i = (e_i - \text{offset}_i) \times \text{gain}_i - y$, where $i = 1, 2, \ldots, 9$.

Further, a confidence requirement condition that needs to be met in step S6 of the present disclosure is as follows: the calculation result of the current frame image is saved, the calculation result of the subsequence frame image is compared with the calculation result of the current frame image, the confidence is calculated, and when no less than three frames in results respectively outputted by continuous five frame images are identical, it can be considered that the confidence condition is met.

The present disclosure provides a road sign recognition system, including:

an image collection unit, configured to obtain a road image of a vehicle in a moving process in real time, perform color threshold binarization on a single frame image in the road image in the HSV space, localize a sign according to a sign color feature, and obtain a localized sign connected region;

a target localization region calculation unit, configured to calculate a length-to-width ratio of the sign connected region according to information about a position and a size of the localized sign connected region, and set a threshold of the length-to-width ratio to eliminate a false target; and calculate a distance from a contour edge to a target center position in the sign connected region, and obtain a target localization region with a circular contour of the sign connected region;

a binary image calculation unit, configured to, in a grayscale image on which color threshold binarization is performed, intercept a corresponding grayscale image and calculate an average grayscale value of the grayscale image according to the obtained target localization region, perform binarization on the grayscale image of the target localization region by using the average grayscale value as a threshold, and obtain a binary image of each target localization region;

a to-be-recognized binary image extraction unit, configured to extract connected regions in the binary images of the target localization regions, sort the connected regions according to coordinates, and obtain a binary image of a number or a character inside each target localization region;

a neural network algorithm recognition unit, configured to calculate and determine the binary image of the number or the character inside the target localization region by using a neural network mode recognition algorithm, and obtain a number or a character on the target sign; and a recognition result verification unit, configured to save a calculation result of a current frame image, compare a calculation result of a subsequent frame image with the calculation result of the current frame image, calculate confidence, and output a recognition result that meets a confidence requirement.

Beneficial effects produced by the present disclosure are as follows: in a road sign recognition method of the present disclosure, a road sign image is filtered out by determining a contour of a target image, so that recognition efficiency is high, and a height limit sign and a width limit sign can be recognized; a number or a character on a road sign is recognized by using an improved neural network algorithm. Compared with the traditional template matching method, calculation efficiency is provided, and recognition accuracy is greatly improved. Compared with the existing neural network algorithm, an introduced feature quantity is reduced, and calculation efficiency is not easy to affect, and calculation accuracy is high. A balance between calculation efficiency and calculation accuracy is fully considered by dividing a to-be-recognized image into nine square grids.

BRIEF DESCRIPTION OF THE DRAWINGS

The present disclosure is further described below with reference to accompanying drawings and embodiments. In the accompanying drawings.

DETAILED DESCRIPTION OF THE INVENTION

To make the objectives, technical solutions, and advantages of the present disclosure clearer, the following further describes the present disclosure in detail with reference to the accompanying drawings and the embodiments. It should be noted that, the specific embodiments described herein are merely intended for explaining the present disclosure, but not for limiting the present disclosure.

A road sign recognition method in the embodiments of the present disclosure includes the following steps:

S1. a road image of a vehicle in a moving process is obtained in real time, color threshold binarization is performed on a single frame image in the road image in the HSV space, a sign is localized according to a color feature of the sign, and a localized sign connected region is obtained.

S2. a length-to-width ratio of the sign connected region is calculated according to information about a position and a size of the localized sign connected region, and a threshold of the length-to-width ratio is set to eliminate a false target; and a distance from a contour edge to a target center position in the sign connected region is calculated, and a target localization region with a circular contour of the sign connected region is obtained.

S3. In a grayscale image on which color threshold binarization is performed, a corresponding grayscale image is intercepted and an average grayscale value of the grayscale image is calculated according to the obtained target localization region, binarization on the grayscale image of the target localization region is performed by using the average grayscale value as a threshold, and a binary image of each target localization region is obtained.

S4. a connected region in the binary image of the target localization region is extracted, the connected region is sorted according to coordinates, and a binary image of a number or a character inside each target localization region is obtained.

S5. the binary image of the number or the character inside the target localization region is calculated and determined by using a neural network mode recognition algorithm, and a number or a character on the target sign is obtained.

S6. a calculation result of a current frame image is saved, a calculation result of a subsequent frame image is compared with the calculation result of the current frame image, confidence is calculated, and a recognition result that meets a confidence requirement is output.

The threshold of the length-to-width ratio that is set to eliminate the false target in step S2 ranges from 0.9 to 1.1.

Step S3 further includes a method of recognizing a height limit sign and a width limit sign:

if there is a sign with longitudinal symmetrical triangles in a circular contour of the circular target localization region, and a ratio of a distance between apex angles of the triangles to a diameter of the circular contour ranges from 0.7 to 0.9, it indicates that the sign is the height limit sign; and if there is a sign with bilateral symmetrical triangles in a circular contour of the circular target localization region, and a ratio of a distance between apex angles of the triangles to a diameter of the circular contour ranges from 0.7 to 0.9, it indicates that the sign is the width limit sign.

A specific method of the neural network mode recognition algorithm in step S5 includes:

statistics about a binary image of a number or a character in a to-be-recognized target localization region are collected as a 9-dimensional feature matrix, the binary image is divided into nine square grids, and statistics about a black-to-white pixel ratio in each grid are collected to obtain a 9-dimensional feature matrix. A sigmoid activation function is used in a network hidden layer, calculation is performed by using a competition network in an output layer, and the number or the character represented by the binary image is obtained.

A method for calculating the 9-dimensional feature matrix specifically includes:

if a resolution of the binary image of the number or the character obtained through interception is m×n, which is formed by m rows and n columns of pixels, and indicated as a matrix $D_{m \times n}$, a 9-dimensional feature matrix $E_{1 \times 9}$ is calculated by using the following formula:

$$E = [\, e_1 \ \ e_2 \ \ e_3 \ \ e_4 \ \ e_5 \ \ e_6 \ \ e_7 \ \ e_8 \ \ e_9 \,]$$

$$e_i = \sum_{i=1}^{\frac{m}{3}} \sum_{j=1}^{\frac{n}{3}} \mathrm{cal}(d(i,j))$$

$$\mathrm{cal}(d(i,j)) = \begin{cases} 0, & \text{if } d(i,j) = 0 \\ 1, & \text{if } d(i,j) \neq 0 \end{cases}$$

$$d = \begin{cases} D\!\left(1:\frac{m}{3},\, 1:\frac{n}{3}\right), & \text{if } i=1 \\ D\!\left(1:\frac{m}{3},\, \frac{n}{3}+1:\frac{2 \times n}{3}\right), & \text{if } i=2 \\ D\!\left(1:\frac{m}{3},\, \frac{2 \times n}{3}+1:n\right), & \text{if } i=3 \\ D\!\left(\frac{m}{3}+1:\frac{2 \times m}{3},\, 1:\frac{n}{3}\right), & \text{if } i=4 \\ D\!\left(\frac{m}{3}+1:\frac{2 \times m}{3},\, \frac{n}{3}+1:\frac{2 \times n}{3}\right), & \text{if } i=5, \\ D\!\left(\frac{m}{3}+1:\frac{2 \times m}{3},\, \frac{2 \times n}{3}+1:n\right), & \text{if } i=6 \\ D\!\left(\frac{2 \times m}{3}+1:m,\, 1:\frac{n}{3}\right), & \text{if } i=7 \\ D\!\left(\frac{2 \times m}{3}+1:m,\, \frac{n}{3}+1:\frac{2 \times n}{3}\right), & \text{if } i=8 \\ D\!\left(\frac{2 \times m}{3}+1:m,\, \frac{2 \times n}{3}+1:n\right), & \text{if } i=9 \end{cases}$$

and a feature matrix E of the to-be-recognized target number or character is obtained through calculation.

The method further includes a method for optimizing the matrix E according to a result obtained through sample statistics collection and calculation:

based on the sample statistics collection, three correction matrixes $\mathrm{offset}_{1 \times 9}$, $\mathrm{gain}_{1 \times 9}$, $y_{1 \times 1}$ are obtained, and the feature matrix as $e_i = (e_i - \mathrm{offset}_i) \times \mathrm{gain}_i - y$ is corrected, wherein i=1, 2, . . . , 9.

A confidence requirement condition that needs to be met in step S6 is as follows: the calculation result of the current frame image is saved, the calculation result of the subsequence frame image is compared with the calculation result of the current frame image, the confidence is calculated, and when no less than three frames in results respectively outputted by continuous five frame images are the same, it can be considered that the confidence condition is met.

A road sign recognition system of the embodiments of the present disclosure is configured to implement the road sign recognition method of the embodiments of the present disclosure, and includes:

an image collection unit, configured to obtain a road image of a vehicle in a moving process in real time, perform color threshold binarization on a single frame image in the road image in the HSV space, localize a sign according to a sign color feature, and obtain a localized sign connected region;

a target localization region calculation unit, configured to calculate a length-to-width ratio of the sign connected region according to information about a position and a size of the localized sign connected region, and set a threshold of the length-to-width ratio to eliminate a false target; and calculate a distance from a contour edge to a target center position in the sign connected region, and obtain a target localization region with a circular contour of the sign connected region;

a binary image calculation unit, configured to, in a grayscale image on which color threshold binarization is performed, intercept a corresponding grayscale image and calculate an average grayscale value of the grayscale image according to the obtained target localization region, perform binarization on the grayscale image of the target localization region by using the average grayscale value as a threshold, and obtain a binary image of each target localization region;

a to-be-recognized binary image extraction unit, configured to extract connected regions in the binary images of the target localization region, sort the connected regions according to coordinates, and obtain a binary image of a number or a character inside each target localization region;

a neural network algorithm recognition unit, configured to calculate and determine the binary image of the number or the character inside the target localization region by using a neural network mode recognition algorithm, and obtain a number or a character on the target sign; and a recognition result verification unit, configured to save a calculation result of a current frame image, compare a calculation result of a subsequent frame image with the calculation result of the current frame image, calculate confidence, and output a recognition result that meets a confidence requirement.

Figure 1:
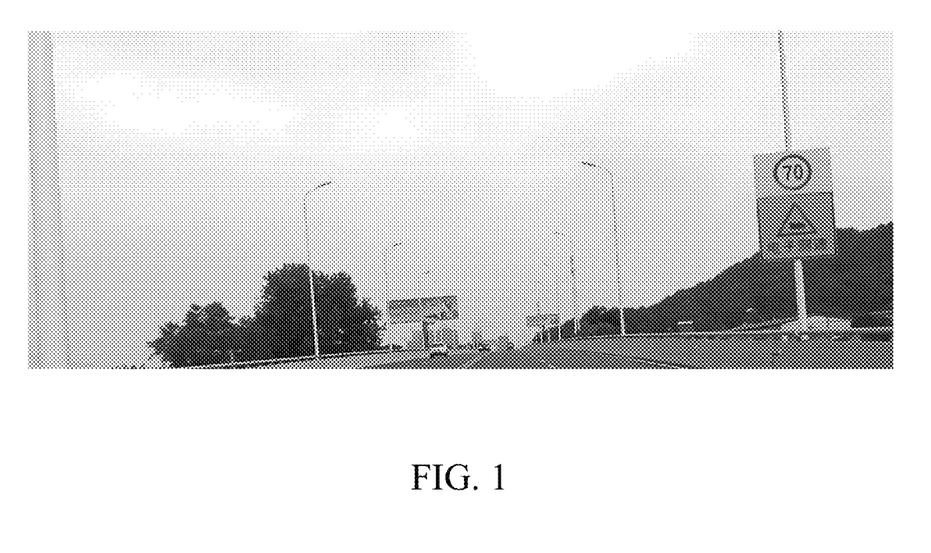
FIG. 1 is a frame image of a road video according to an embodiment of the present disclosure.
Figure 2:
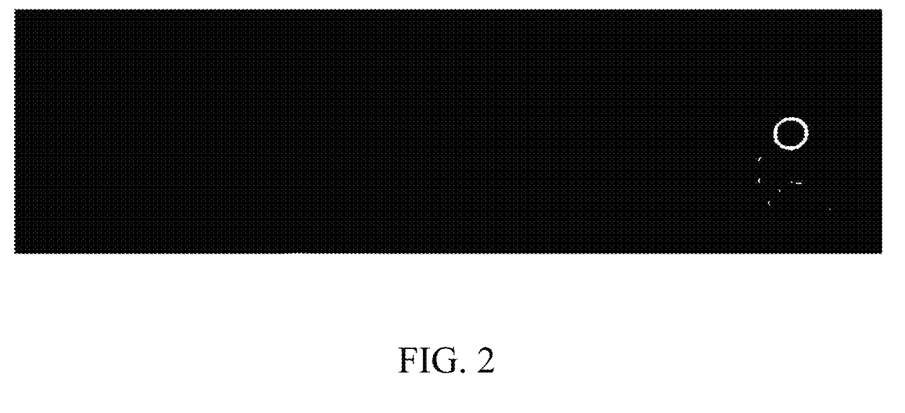
FIG. 2 is an image obtained after HSV threshold value binarization is performed on an image according to an embodiment of the present disclosure.

In another specific embodiment of the present disclosure:

(1) Color threshold binarization is performed on a single frame image in the HSV space, and a sign is localized according to a sign color feature. FIG. 1 is a single frame image. FIG. 2 is a red threshold binarization image for a red outer ring of a speed limit sign, and a to-be-recognized target can be localized on the red threshold binarization image. For color features of different signs, different color thresholds can be set for targeted localization.

The sign is localized based on the connected region, and information about a position and a size of a target contour can be localized in the image. A length-to-width ratio is used as a determining condition, and a threshold is set to eliminate a false target. Road signs are mostly circular, and a length-to-width ratio of an outer border of a contour is close to 1. As shown in FIG. 2, the target position can be localized.

(2) A range of a candidate target is further narrowed down, to eliminate the false target. Brief description of the method is as follows: a distance from a contour edge of the connected region to a target center position is calculated, and statistics about a result is collected. A circular contour target is kept.

Figure 3:
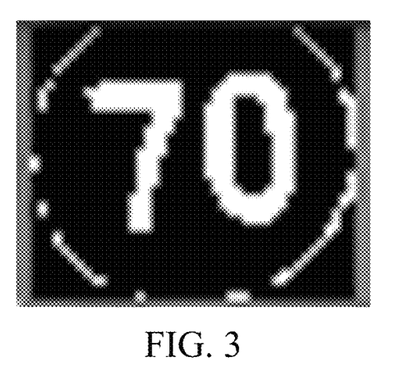
FIG. 3 is a target binarization image according to an embodiment of the present disclosure.

In FIG. 3, an outer white circle surrounding the number 70 represents the inner contour of the connected region. The inner contour of the candidate target is circular (similar to circular).

(3) In the grayscale image, a candidate target grayscale image is intercepted and an average grayscale value of the candidate target grayscale image is calculated according to a candidate target localization region. Binarization is performed on the candidate target grayscale image by using the average grayscale value as a threshold.

Figure 4:
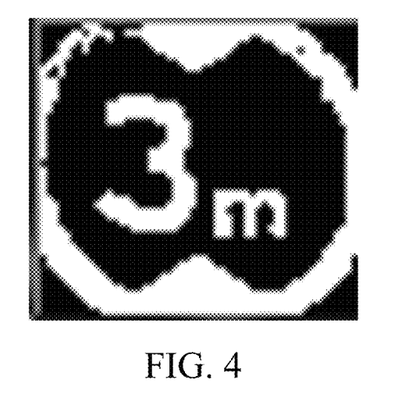
FIG. 4 is a binarization image of a height limit sign according to an embodiment of the present disclosure.
Figure 5:
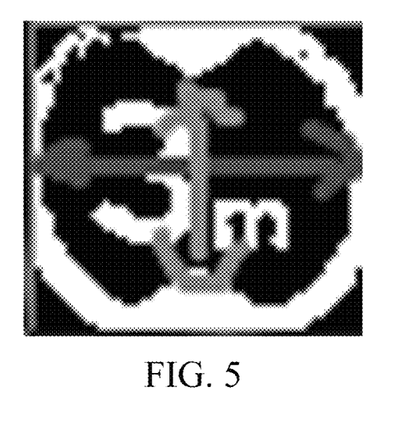
FIG. 5 is a sign determining image according to an embodiment of the present disclosure.

FIG. 4 is a binarization image of a height limit sign in a frame. To distinguish between the height limit sign and a limit width sign, for an inner contour feature of the limit sign, a ratio of a lateral width to a longitudinal width is calculated in FIG. 5 to determine a type of the limit sign. (Only common signs can be recognized, special signs cannot be recognized here, such as "three-meter maximum height limit" written in Chinese characters is not recognized).

(4) Connected regions in the binary images are extracted and the connected regions are sorted (according to coordinates). As shown in FIG. 3, according to this step, binary images of numbers 7 and 0 can be obtained.

(5) A target number or character is calculated and determined by using a neural network mode recognition algorithm.

Figure 6:
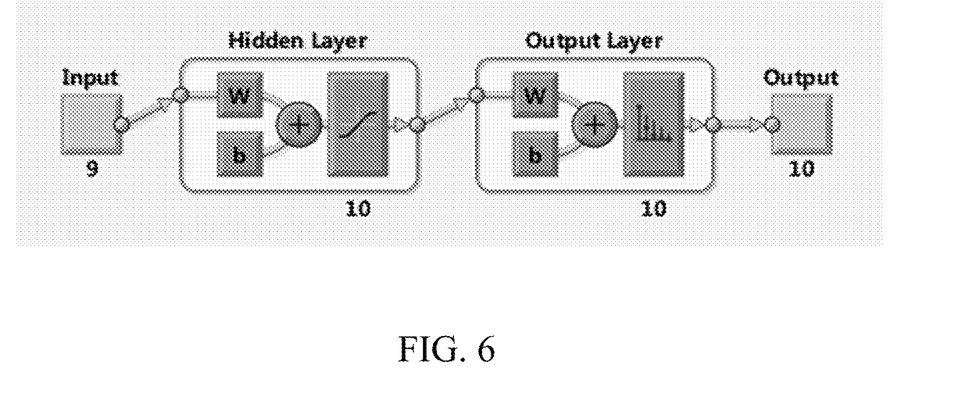
FIG. 6 is a flowchart of neural network calculation according to an embodiment of the present disclosure.

Statistics about a binary image of the target number or character is collected as a 9-dimensional feature matrix, a sigmoid activation function (a hyperbolic function) is used in a network hidden layer, and calculation is performed by using a competition network in an output layer. Finally, a result is obtained, and the number or character represented by the binary image is obtained.

Figure 7:
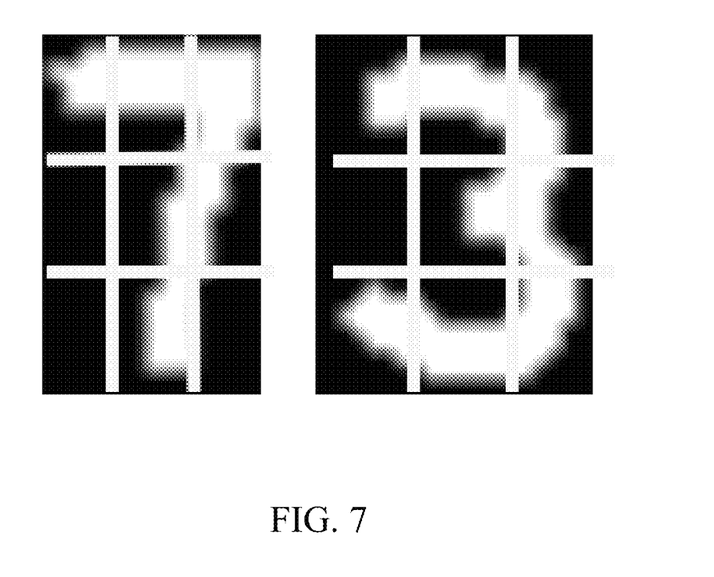
FIG. 7 is a diagram of a 9-dimensional feature matrix according to an embodiment of the present disclosure.
Figure 8:
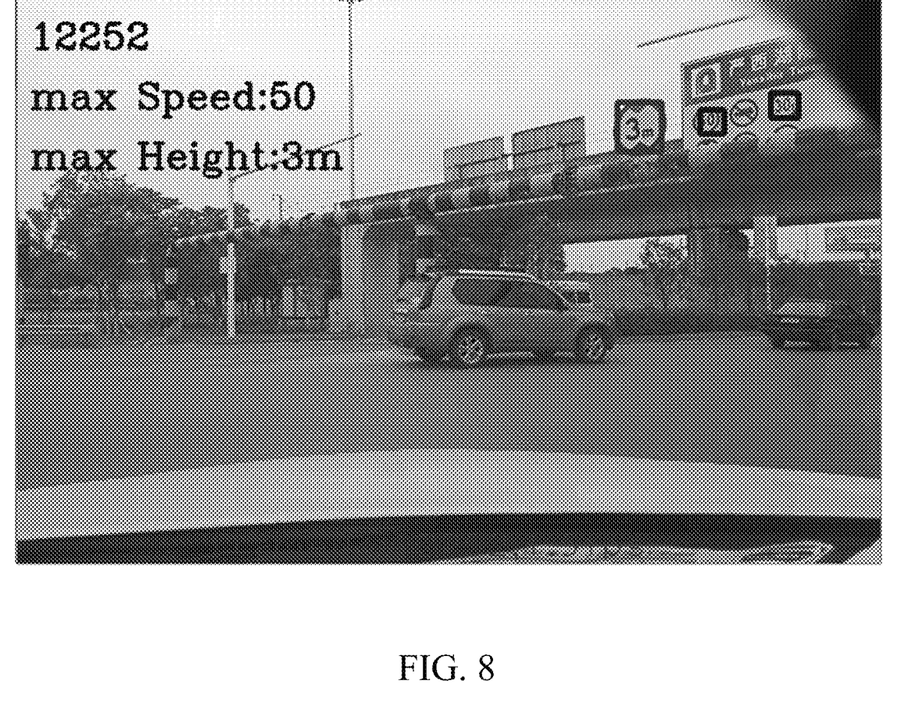
FIG. 8 is a frame image of a road video according to an embodiment of the present disclosure.
Figure 9:
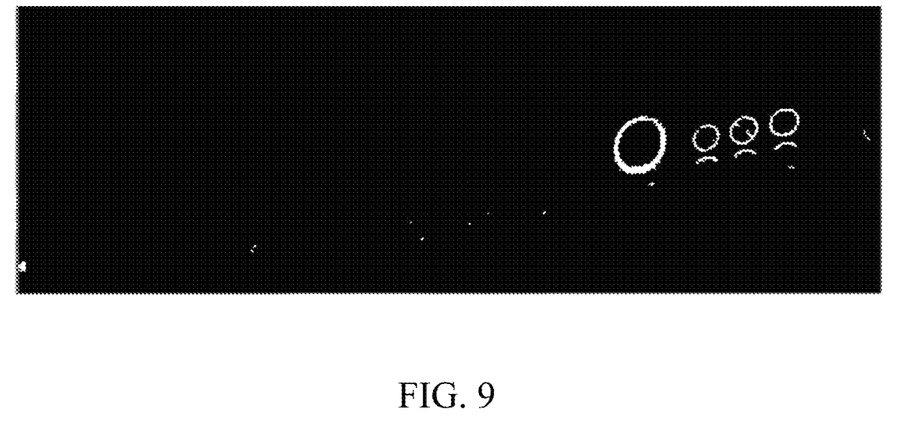
FIG. 9 is an image obtained after HSV threshold binarization is performed on an image according to an embodiment of the present disclosure.

9-dimensional feature matrix: the binary image of the number (below) is divided into nine square grids, and statistics about a black-to-white pixel ratio in each grid are collected to obtain a 9-dimensional feature matrix.

if a resolution of the binary image of the number or the character obtained through interception is m×n which is formed by m rows and n columns of pixels, and indicated as a matrix $D_{m \times n}$, a 9-dimensional feature matrix $E_{1 \times 9}$ is calculated by using the following formula:

$$E = [\, e_1 \;\; e_2 \;\; e_3 \;\; e_4 \;\; e_5 \;\; e_6 \;\; e_7 \;\; e_8 \;\; e_9 \,]$$

$$e_i = \sum_{i=1}^{\frac{m}{3}} \sum_{j=1}^{\frac{n}{3}} \text{cal}(d(i, j))$$

$$\text{cal}(d(i, j)) = \begin{cases} 0, & \text{if } d(i, j) = 0 \\ 1, & \text{if } d(i, j) \neq 0 \end{cases}$$

$$d = \begin{cases} D\left(1:\frac{m}{3}, 1:\frac{n}{3}\right), & \text{if } i = 1 \\ D\left(1:\frac{m}{3}, \frac{n}{3}+1:\frac{2 \times n}{3}\right), & \text{if } i = 2 \\ D\left(1:\frac{m}{3}, \frac{2 \times n}{3}+1:n\right), & \text{if } i = 3 \\ D\left(\frac{m}{3}+1:\frac{2 \times m}{3}, 1:\frac{n}{3}\right), & \text{if } i = 4 \\ D\left(\frac{m}{3}+1:\frac{2 \times m}{3}, \frac{n}{3}+1:\frac{2 \times n}{3}\right), & \text{if } i = 5 \\ D\left(\frac{m}{3}+1:\frac{2 \times m}{3}, \frac{2 \times n}{3}+1:n\right), & \text{if } i = 6 \\ D\left(\frac{2 \times m}{3}+1:m, 1:\frac{n}{3}\right), & \text{if } i = 7 \\ D\left(\frac{2 \times m}{3}+1:m, \frac{n}{3}+1:\frac{2 \times n}{3}\right), & \text{if } i = 8 \\ D\left(\frac{2 \times m}{3}+1:m, \frac{2 \times n}{3}+1:n\right), & \text{if } i = 9 \end{cases}$$

A feature matrix E of the to-be-recognized target number or character is obtained through calculation, but calculation and recognition cannot be directly performed on the matrix E. The matrix E is optimized according to a result obtained through sample statistics collection and calculation.

The optimization method includes:

based on the sample statistics collection, three correction matrixes offset$_{1\times9}$, gain$_{1\times9}$, y$_{1\times1}$ are obtained, and the feature matrix is corrected as e$_i$=(e$_i$−offset$_i$)×gain$_i$−y, where i=1, 2, ..., 9.

Neural network calculation is performed, and network hidden layer parameter matrixes are W$_{H\ 9\times10}$ and b$_{H\ 1\times10}$;

The hidden layer parameter matrixes are used in calculation RES1=E·W$_H$+b$_H$.

Hidden layer output output$_{H\ 1\times10}$ is obtained by using a sigmoid function:

$$\text{output}_H(i) = \frac{2}{1+e^{-2\times RES1(i)}} - 1, i = 1, 2, \ldots 10,$$

wherein e is a natural logarithm in the above formula, and e≈2.71828.

After the hidden layer output output$_{H_{1\times10}}$ in is calculated by using an output layer network, a final output result may be obtained below:

Network output layer parameter matrixes are W$_{O_{10\times10}}$, b$_{O_{10\times10}}$.

An output layer middle matrix RES2=output$_H$·W$_O$+b$_O$ is calculated by using the parameter matrixes.

A dimension of the middle matrix RES2 is 1×10.

A final output matrix output$_{O_{1\times10}}$ is obtained through calculation by using a competition network.

A calculation process is as follows:

$$RES2(i) = e^{(RES2(i)-max(RES2))}$$

$$\text{sum} = \begin{cases} \sum_{i=1}^{10} RES2(i) \\ 1, \text{ if } \sum_{i=1}^{10} RES2(i) = 0 \end{cases}$$

$$\text{output}_O = RES2/\text{sum}$$

$$i = 1, 2, \ldots, 10$$

$$e \approx 2.71828$$

Ten numbers 0~9 are recognized by using this algorithm in this embodiment. Therefore, the result matrix output$_{O_{1\times10}}$ is 10-dimensional.

A value of an element in the matrix represents confidence of a corresponding recognition result. Therefore, a subscript minus 1 of the maximum element in the matrix is a recognition result.

(6) Confidence determining: a result of a current frame is saved, the result of the current frame compared with a result of a subsequent frame, and the confidence is calculated. A result with high confidence is outputted. Three frames in the results separately outputted from the five frames are the same, that is, it is considered that the confidence is high.

It should be noted that persons of ordinary skill in the art may still make improvements or changes to the foregoing description, and these improvements and changes should fall within the protection scope of the claims of the present disclosure.

What is claimed is:

1. A road sign recognition method, comprising: the following steps:
    S1: obtaining a road image of a vehicle in a moving process in real time, performing color threshold binarization on a single frame image in the road image in the HSV space, localizing a sign according to a color feature of the sign, and obtaining a localized sign connected region;
    S2: calculating a length-to-width ratio of the sign connected region according to information about a position and a size of the localized sign connected region, and setting a threshold of the length-to-width ratio to eliminate a false target; and calculating a distance from a contour edge to a target center position in the sign connected region, and obtaining a target localization region with a circular contour of the sign connected region;
    S3: in a grayscale image on which color threshold binarization is performed, intercepting a corresponding grayscale image and calculating an average grayscale value of the grayscale image according to the obtained target localization region, performing binarization on the grayscale image of the target localization region by using the average grayscale value as a threshold, and obtaining a binary image of each target localization region;
    S4: extracting connected regions in the binary images of the target localization regions, sorting the connected regions according to coordinates, and obtaining a binary image of a number or a character inside each target localization region;
    S5: calculating and determining the binary image of the number or the character inside the target localization region by using a neural network mode recognition algorithm, and obtaining a number or a character on a target sign; and
    S6: saving a calculation result of a current frame image, comparing a calculation result of a subsequent frame image with the calculation result of the current frame image, calculating confidence, and outputting a recognition result that meets a confidence requirement.

2. The road sign recognition method according to claim 1, wherein the threshold of the length-to-width ratio that is set to eliminate the false target in S2 ranges from 0.9 to 1.1.

3. The road sign recognition method according to claim 1, wherein S3 further comprises a method of recognizing a height limit sign and a width limit sign:
    if there is a sign with longitudinal symmetrical triangles in a circular contour of the circular target localization region, and a ratio of a distance between apex angles of the triangles to a diameter of the circular contour ranges from 0.7 to 0.9, it indicates that the sign is the height limit sign; and
    if there is a sign with bilateral symmetrical triangles in a circular contour of the circular target localization region, and a ratio of a distance between apex angles of the triangles to a diameter of the circular contour ranges from 0.7 to 0.9, it indicates that the sign is the width limit sign.

4. The road sign recognition method according to claim 1, wherein a specific method of the neural network mode recognition algorithm in S5 comprises:

collecting statistics about a binary image of a number or a character in a to-be-recognized target localization region as a 9-dimensional feature matrix, dividing the binary image into nine square grids, and collecting statistics about a black-to-white pixel ratio in each grid to obtain a 9-dimensional feature matrix, wherein a sigmoid activation function is used in a network hidden layer, calculation is performed by using a competition network in an output layer, and the number or the character represented by the binary image is obtained.

5. The road sign recognition method according to claim 4, wherein a method for calculating the 9-dimensional feature matrix specifically comprises:

if a resolution of the binary image of the number or the character obtained through interception is m×n, which is formed by m rows and n columns of pixels, and indicated as a matrix $D_{m \times n}$, calculating a 9-dimensional feature matrix $E_{1 \times 9}$ by using the following formula:

$$E = [\, e_1 \; e_2 \; e_3 \; e_4 \; e_5 \; e_6 \; e_7 \; e_8 \; e_9 \,]$$

$$e_i = \sum_{i=1}^{\frac{m}{3}} \sum_{j=1}^{\frac{n}{3}} \mathrm{cal}(d(i,j))_{D_{m \times n}}$$

$$\mathrm{cal}(d(i,j)) = \begin{cases} 0, & \text{if } d(i,j) = 0 \\ 1, & \text{if } d(i,j) \neq 0 \end{cases}$$

$$d = \begin{cases} D\!\left(1{:}\tfrac{m}{3},\, 1{:}\tfrac{n}{3}\right), & \text{if } i = 1 \\[2pt] D\!\left(1{:}\tfrac{m}{3},\, \tfrac{n}{3}+1{:}\tfrac{2\times n}{3}\right), & \text{if } i = 2 \\[2pt] D\!\left(1{:}\tfrac{m}{3},\, \tfrac{2\times n}{3}+1{:}n\right), & \text{if } i = 3 \\[2pt] D\!\left(\tfrac{m}{3}+1{:}\tfrac{2\times m}{3},\, 1{:}\tfrac{n}{3}\right), & \text{if } i = 4 \\[2pt] D\!\left(\tfrac{m}{3}+1{:}\tfrac{2\times m}{3},\, \tfrac{n}{3}+1{:}\tfrac{2\times n}{3}\right), & \text{if } i = 5 \\[2pt] D\!\left(\tfrac{m}{3}+1{:}\tfrac{2\times m}{3},\, \tfrac{2\times n}{3}+1{:}n\right), & \text{if } i = 6 \\[2pt] D\!\left(\tfrac{2\times m}{3}+1{:}m,\, 1{:}\tfrac{n}{3}\right), & \text{if } i = 7 \\[2pt] D\!\left(\tfrac{2\times m}{3}+1{:}m,\, \tfrac{n}{3}+1{:}\tfrac{2\times n}{3}\right), & \text{if } i = 8 \\[2pt] D\!\left(\tfrac{2\times m}{3}+1{:}m,\, \tfrac{2\times n}{3}+1{:}n\right), & \text{if } i = 9 \end{cases}$$

and obtaining a feature matrix E of the to-be-recognized target number or character through calculation.

6. The road sign recognition method according to claim 5, wherein the method further comprises a method for optimizing the matrix E according to a result obtained through sample statistics collection and calculation:

based on the sample statistics collection, three correction matrixes $\mathrm{offset}_{1 \times 9}$, $\mathrm{gain}_{1 \times 9}$, $y_{1 \times 1}$, and correcting the feature matrix as $e_i = (e_i - \mathrm{offset}_i) \times \mathrm{gain}_i - y$, wherein $i = 1, 2, \ldots, 9$.

7. The road sign recognition method according to claim 1, wherein a confidence requirement condition that needs to be met in S6 is as follows: the calculation result of the current frame image is saved, the calculation result of the subsequence frame image is compared with the calculation result of the current frame image, the confidence is calculated, and when no less than three frames in results respectively outputted by continuous five frame images are identical, it can be considered that the confidence condition is met.

* * * * *